United States Patent
Dhawan et al.

(10) Patent No.: US 12,435,280 B2
(45) Date of Patent: Oct. 7, 2025

(54) CRUDE OIL DEMULSIFIER COMPOSITIONS AND USES THEREOF

(71) Applicant: ECOLAB USA INC., St. Paul, MN (US)

(72) Inventors: Ashish Dhawan, Aurora, IL (US); Regan Andrew Jones, Sugar Land, TX (US)

(73) Assignee: ECOLAB USA Inc., St. Paul, MN (US)

( * ) Notice: Subject to any disclaimer, the term of this patent is extended or adjusted under 35 U.S.C. 154(b) by 796 days.

(21) Appl. No.: 17/722,951

(22) Filed: Apr. 18, 2022

(65) Prior Publication Data

US 2022/0364000 A1 Nov. 17, 2022

Related U.S. Application Data

(60) Provisional application No. 63/177,677, filed on Apr. 21, 2021.

(51) Int. Cl.

| | |
|---|---|
| *C10G 33/04* | (2006.01) |
| *B01D 17/04* | (2006.01) |
| *C02F 1/68* | (2023.01) |
| *C08F 222/06* | (2006.01) |
| *C02F 101/32* | (2006.01) |
| *C02F 103/36* | (2006.01) |

(52) U.S. Cl.
CPC ............ *C10G 33/04* (2013.01); *B01D 17/047* (2013.01); *C02F 1/682* (2013.01); *C08F 222/06* (2013.01); *C02F 2101/32* (2013.01); *C02F 2103/365* (2013.01)

(58) Field of Classification Search
CPC ...... C10G 33/04; B01D 17/047; C09K 8/584; C08F 222/06; C08F 222/40; C08F 222/404
See application file for complete search history.

(56) References Cited

U.S. PATENT DOCUMENTS

| | | | |
|---|---|---|---|
| 3,471,458 A | 10/1969 | Mehmedbasich | |
| 3,476,686 A | 11/1969 | Verdol et al. | |
| 3,651,028 A | 3/1972 | Maemoto et al. | |
| 3,929,632 A | 12/1975 | Buriks et al. | |
| 4,102,798 A | 7/1978 | Ryer et al. | |
| 4,391,721 A | 7/1983 | Pappas | |
| 4,707,285 A | 11/1987 | Brewster et al. | |
| 4,734,204 A * | 3/1988 | Lamb | C08F 8/14 210/708 |
| 4,740,561 A | 4/1988 | Tsujimoto et al. | |
| 4,892,567 A | 1/1990 | Yan | |
| 5,017,299 A | 5/1991 | Gutierrez et al. | |
| 5,110,997 A | 5/1992 | Dickakian | |
| 5,214,224 A | 5/1993 | Comer et al. | |
| 5,219,480 A | 6/1993 | Gutierrez et al. | |
| 5,427,690 A | 6/1995 | Rowe et al. | |
| 5,705,603 A | 1/1998 | Krull et al. | |
| 5,756,428 A | 5/1998 | Emert et al. | |
| 5,882,506 A | 3/1999 | Ohsol et al. | |
| 6,015,863 A | 1/2000 | Mike et al. | |
| 6,107,450 A | 8/2000 | Harrison et al. | |
| 6,548,458 B2 | 4/2003 | Loper | |
| 6,946,524 B2 | 9/2005 | Breuer et al. | |
| 7,067,599 B2 | 6/2006 | Tack et al. | |
| 8,067,347 B2 | 11/2011 | Ruhe, Jr. et al. | |
| 8,980,804 B2 | 3/2015 | Loper et al. | |
| 9,085,737 B2 | 7/2015 | Yeganeh et al. | |
| 9,181,510 B2 | 11/2015 | Barton et al. | |
| 9,663,744 B2 | 5/2017 | Zhang et al. | |
| 10,006,276 B1 | 6/2018 | Lawson et al. | |
| 10,006,277 B1 | 6/2018 | Lawson et al. | |
| 10,082,010 B1 | 9/2018 | Lawson et al. | |
| 10,087,732 B1 | 10/2018 | Lawson et al. | |
| 10,113,101 B2 | 10/2018 | Soriano, Jr. et al. | |
| 10,125,590 B1 | 11/2018 | Lawson et al. | |
| 10,180,052 B1 | 1/2019 | Lawson et al. | |
| 10,190,061 B1 | 1/2019 | Lawson et al. | |
| 10,202,832 B1 | 2/2019 | Lawson et al. | |
| 10,215,006 B1 | 2/2019 | Lawson et al. | |
| 10,233,273 B2 | 3/2019 | Kundu et al. | |
| 10,260,008 B1 | 4/2019 | Lawson et al. | |
| 10,260,326 B1 | 4/2019 | Lawson et al. | |
| 10,273,418 B1 | 4/2019 | Lawson et al. | |
| 10,280,374 B1 | 5/2019 | Lawson et al. | |

(Continued)

FOREIGN PATENT DOCUMENTS

| | | |
|---|---|---|
| CA | 2075749 C | 11/2004 |
| EP | 0815150 B1 | 12/1999 |

(Continued)

OTHER PUBLICATIONS

Jeffamine Polyetheramine. Huntsman. 2023. (Year: 2023).*
Abdel-Azim, A.-A., Nasser, A., Ahmed, N., & S. Kamal, R. (Jan. 2011). Multifunctional Lube Oil Additives Based on Octadecene-Maleic Anhydride Copolymer. Petroleum Science and Technology, 29, 97-107. doi:10.1080/10916460903069829.
Atta, Ayman M. (2013). Electric desalting and dewatering of crude oil emulsion based on Schiff base polymers as demulsifier. International Journal of Electrochemical Science. 8. 9474-9498.
Chen, Mingyan. (2011). Influential factors analysis of heavy crude oil electrical desalting and optimization research of operation conditions. Shiyou Yu Tianranqi Huagong. 40. 578-580.
Chen, Mingyan. (2011). Research advances in demulsifiers for electric desalting in refinery. Jingxi Shiyou Huagong Jinzhan. 12. 51-54.
Ding, Qiu-wei. (2014). The study on electric desalting demulsifier. Tianjin Huagong. 28. 27-29.

(Continued)

*Primary Examiner* — Stephen E Rieth
(74) *Attorney, Agent, or Firm* — Eric D. Babych; Barnes & Thornburg LLP

(57) ABSTRACT

The present disclosure relates to demulsifier compositions and methods of resolving emulsions using the compositions. The demulsifiers include modified hydroxy-succinimide copolymers. For example, the demulsifiers may include ethoxylated or propoxylated hydroxy-succinimide copolymers. The demulsifier compositions are useful for resolving oil-in-water, water-in-oil, and complex emulsions of water and oil.

18 Claims, No Drawings

(56) References Cited

U.S. PATENT DOCUMENTS

| | | | |
|---|---|---|---|
| 10,280,375 | B1 | 5/2019 | Lawson et al. |
| 10,294,429 | B1 | 5/2019 | Lawson et al. |
| 10,899,989 | B2 | 1/2021 | Jiang et al. |
| 2003/0166811 | A1 | 9/2003 | Peiffer et al. |
| 2003/0217971 | A1 | 11/2003 | Varadaraj et al. |
| 2004/0139931 | A1 | 7/2004 | Duncan et al. |
| 2004/0266973 | A1 | 12/2004 | Strickland et al. |
| 2005/0000862 | A1 | 1/2005 | Stark et al. |
| 2006/0036057 | A1 | 2/2006 | Lang |
| 2007/0111903 | A1 | 5/2007 | Engel et al. |
| 2007/0276052 | A1 | 11/2007 | Varadaraj |
| 2008/0187665 | A1 | 8/2008 | Banning |
| 2009/0133577 | A1 | 5/2009 | Falkiner et al. |
| 2010/0089797 | A1 | 4/2010 | Chakka et al. |
| 2010/0140141 | A1 | 6/2010 | Cendejas Santana et al. |
| 2010/0234247 | A1 | 9/2010 | Varadaraj |
| 2010/0276375 | A1 | 11/2010 | Sams |
| 2011/0068049 | A1 | 3/2011 | Garcia, III et al. |
| 2011/0100402 | A1* | 5/2011 | Soane .................. C08F 222/06 134/29 |
| 2012/0024758 | A1 | 2/2012 | Love |
| 2012/0181218 | A1 | 7/2012 | Chakka et al. |
| 2012/0212729 | A1 | 8/2012 | Hart et al. |
| 2012/0255886 | A1 | 10/2012 | Flores Oropeza et al. |
| 2012/0261312 | A1 | 10/2012 | Flores Oropeza et al. |
| 2013/0043192 | A1 | 2/2013 | Smith et al. |
| 2013/0048542 | A1 | 2/2013 | Hamad et al. |
| 2013/0299390 | A1 | 11/2013 | Koczo et al. |
| 2014/0131254 | A1 | 5/2014 | Soliman |
| 2014/0202929 | A1 | 7/2014 | Mason et al. |
| 2014/0213668 | A1 | 7/2014 | Meyer |
| 2014/0238900 | A1 | 8/2014 | Flores Oropeza et al. |
| 2014/0238901 | A1 | 8/2014 | Flores Oropeza et al. |
| 2014/0262952 | A1 | 9/2014 | Yeganeh et al. |
| 2014/0275663 | A1 | 9/2014 | Brons |
| 2014/0317998 | A1 | 10/2014 | Metcalfe et al. |
| 2014/0323789 | A1 | 10/2014 | Wines |
| 2014/0353214 | A1 | 12/2014 | Daage et al. |
| 2015/0087729 | A1 | 3/2015 | Flores Oropeza et al. |
| 2015/0175904 | A1 | 6/2015 | Yeganeh et al. |
| 2015/0175905 | A1 | 6/2015 | Love |
| 2015/0315487 | A1* | 11/2015 | Yeganeh .............. C08F 222/06 525/381 |
| 2016/0097004 | A1 | 4/2016 | Adamski et al. |
| 2016/0208176 | A1 | 7/2016 | Barroeta et al. |
| 2016/0222305 | A1 | 8/2016 | Mo et al. |
| 2017/0037324 | A1 | 2/2017 | Daage et al. |
| 2017/0044445 | A1 | 2/2017 | Soliman |
| 2017/0313949 | A1 | 11/2017 | Flores Oropeza et al. |
| 2017/0327686 | A1 | 11/2017 | Flores Oropeza et al. |
| 2018/0002613 | A1 | 1/2018 | Garcia, III et al. |
| 2018/0119031 | A1 | 5/2018 | Haworth et al. |
| 2018/0155644 | A1 | 6/2018 | Sawhney et al. |
| 2018/0195010 | A1 | 7/2018 | Salu et al. |
| 2019/0153335 | A1 | 5/2019 | Lawson et al. |
| 2019/0153835 | A1 | 5/2019 | Lawson et al. |
| 2019/0153837 | A1 | 5/2019 | Lawson et al. |
| 2019/0153838 | A1 | 5/2019 | Lawson et al. |
| 2019/0153839 | A1 | 5/2019 | Lawson et al. |
| 2019/0202962 | A1 | 7/2019 | Braden et al. |
| 2019/0211273 | A1 | 7/2019 | Barroeta et al. |
| 2022/0364000 | A1 | 11/2022 | Dhawan et al. |

FOREIGN PATENT DOCUMENTS

| | | |
|---|---|---|
| EP | 3194538 B1 | 7/2023 |
| GB | 1258650 A | 12/1971 |
| GB | 1526788 A | 9/1978 |
| WO | 2000050540 A1 | 8/2000 |
| WO | 2000050541 A1 | 8/2000 |
| WO | 2004020553 A1 | 3/2004 |
| WO | 2009062312 A1 | 5/2009 |
| WO | 2010008911 A2 | 1/2010 |
| WO | 2019013799 A1 | 1/2019 |
| WO | 2019089043 A1 | 5/2019 |

OTHER PUBLICATIONS

Fan, Yu-xin. (2016). Impact of salts and high-frequency pulsed electric field parameters on water chain formation. Gaoxiao Huaxue Gongcheng Xuebao. 30. 364-370.

Feng, Rusen. (2005). Design and application of an effective emulsion breaker CYZ-L-4 in oil refinery. Shiyou Yu Tianranqi Huagong. 34. 384-386.

Gao, Hongli. (2013). Performance analysis and improvement measurement for electro-desalting of crude oil with high-salt and high-water content. Shiyou Yu Tianranqi Huagong. 42. 18-21.

Goldhammer, Brett P. (2010). Recent development in crude blending, treating, and desalting. Zhongwai Nengyuan. 15. 67-71.

Gou, Shequan. (2010). The application of two-stage ultrasonic-electrical combined desalting technology. Shiyou Lianzhi Yu Huagong. 41. 19-23.

Han, Lei. (2014). Application of oil soluble demulsifier in crude oil electrical desalting and dewatering. Dangdai Huagong. 43. 348-349.

Han, Lei. (2014). Optimization of operation of electro-static desalting for processing high-TAN crude oil. Shiyou Huagong Fushi Yu Fanghu. 31. 34-37.

He, Zhiqiang. (2009). Selection of electro-desalting technologies for mixed refining poor-quality acid heavy crude oil. Zhongwai Nengyuan. 14. 74-77.

Hou, Xia. (2006). Factor analysis about the desalting efficiency affecting the electric desalting and dewatering device and improvement opinions. Shiyou Huagong Yingyong. 25. 37-40.

Hou, Yanchao. (2011). Experimental study on the performance of MPTT decalcification additive for crude oil. Lianyou Jishu Yu Gongcheng. 41. 54-57.

Islam, Badrul. (2015). Petroleum sludge, its treatment and disposal: A review. 13. 1584-1602.

Jing, Junhang. (2014). Application of a new type of oil soluble demulsifier for crude oil. Sichuan Huagong. 17. 20-22.

Johnson Olufemi Adebayo, Affam Augustine Chioma. (2019). Petroleum sludge treatment and disposal: A review. Environmental Engineering Research, 24(2), 191-201. doi: 10.4491/eer.2018.134.

Koshelev, V. N. (2000). New demulsifiers for petroleum preparation processes. Chemistry and Technology of Fuels and Oils. 36. 97-100.

Kumar, Sunil. (2008). Role of demulsifier in crude desalting. Acta Ciencia Indica, Physics. 34. 447-452.

Li, Bengao. (2012). New progress of chemical anticorrosion technology for units processing high acid crude oil. Shiyou Lianzhi Yu Huagong. 43. 82-86.

Li, Haoliang. (2008). Revamp of electric desalter for processing low-quality crude oil. Lianyou Jishu Yu Gongcheng. 38. 21-24.

Li, Long. (2013). Removal of nickel and vanadium from Tahe crude oil by using DTC-CTS. Shiyou Xuebao. 29. 318-324.

Li, Qingmei. (2009). Research on decreasing electric current in electric desalting. Lianyou Jishu Yu Gongcheng. 39. 19-21.

Li, Qingmei. (2011). Assessment of kazakhstan oil demulsifier and optimization of electric desalting process. Shiyou Huagong Sheji. 28. 30-31, 34.

Li, Qingsong. (2005). Selection of crude oil electrical desalting deemulsifier and application of EC2425A oil soluble deemulsifier. Lianyou Jishu Yu Gongcheng. 35. 49-51.

Li, Xiao-guang. (2016). Optimization of electric desalting operating conditions. Anhui Huagong. 42. 52-54.

Li, Xuekun. (2013). Optimization for electrochemical dehydration process of coal tar using response surface methodology. Shiyou Huagong. 42. 1123-1129.

Li, Ying. (2013). Industry application of ultrasonic-pulse transformer electrical desalting technology. Guangzhou Huagong. 41. 176-178.

Liang, Binhua. (2006). Processing Doba crude oil containing high acid number and high calcium. Shiyou Lianzhi Yu Huagong. 37. 12-16.

(56) References Cited

OTHER PUBLICATIONS

Lin, Chian-chen. (2000). De-emulsification of crude oil. Jiemian Kexue Huizhi. 22. 39-45.
Liu, Hong-wei. (2012). Application of ultrasonic technology to northern Shaanxi mixed crude oil desalting. Huaxue Gongcheng. 40. 74-78.
Liu, Jiaguo. (2006). Electric desalting technology of Tahe crude oil. Shiyou Huagong Sheji. 23. 18-20.
Liu, Tonghua. (2005). Problems and countermeasures in processing Doba crude. Lianyou Jishu Yu Gongcheng. 35. 6-11.
Liu, Yucheng. (2013). Synthesis and evaluation of demulsifier for heavy crude oil electrical desalting. Shiyou Xuebao, Shiyou Jiagong. 29. 1083-1089.
Lou, Shisong. (2006). Dehydration of Shengli crude oil. Shiyou Huagong Fushi Yu Fanghu. 23. 8-12.
Lou, Shisong. (2006). Elec. desalting process for highly conductive crude oil. Shiyou Huagong Sheji. 23. 31-33.
Lou, Shisong. (2007). Research on desalination technology and application of Russian mixed crude oil. Lianyou Jishu Yu Gongcheng. 37. 14-17.
Ma, Baoli. (2012). Evaluation of demulsifiers for demulsification/dehydration of Venezuela heavy crude oil and optimizing electrical desalting operation conditions. Shiyou Lianzhi Yu Huagong. 43. 98-102.
PCT International Search Report and Written Opinion for PCT/US2022/025203, mailed Jul. 1, 2022, 11 pages.
PCT International Search Report and Written Opinion for PCT/US2022/025215, mailed Jul. 6, 2022, 9 pages.
Peng, Songzi. (2012). Selection of additives for Tahe crude electrostatic desalting and process optimization. Shiyou Huagong Fushi Yu Fanghu. 29. 14-16.
Qu, Xi-shuang. (2011). Process operation of electric desalting for heavy oil. Liaoning Huagong. 40. 833-835.
Ren, Jiansong. (2011). Technology research on Liuhua crude electric-desalting. Lianyou Jishu Yu Gongcheng. 41. 10-13.
Sams, Gary W. (2000). Emulsion resolution in electrostatic processes. Energy & Fuels. 14. 31-37.
Shang, Feifei. (2012). Study on the demulsification and dehydration technology of Liaohe aged oil. Shiyou Lianzhi Yu Huagong. 43. 36-39.
Shi, Wei. (2008). Optimization of operating conditions of high-velocity electric desalting process. Lianyou Jishu Yu Gongcheng. 38. 16-18.
Sun, Pingwen. (2009). Research and application of electric desalting process on condensate oil treatment unit. Henan Huagong. 26. 38-39.
Tan, Li. (2009). Review on crude oil desalting and dehydration processes. Lianyou Jishu Yu Gongcheng. 39. 1-7.
Vafajoo, Leila. (2012). Influence of key parameters on crude oil desalting: An experimental and theoretical study. Journal of Petroleum Science & Engineering. 90-91, 107-111.
Wang, Guanchun. (2009). Application of high-speed electric desalination technology in refining Russian crude oil. Zhongwai Nengyuan. 14. 81-84.
Wang, Huiyuan. (2009). Industrial test of electric desalination by ultrasonic demulsification. Shihua Jishu Yu Yingyong. 27. 457-460.
Wang, Jigang. (2012). Selection of electro-static desalting process for high-TAN crude oil. Lianyou Jishu Yu Gongcheng. 42. 31-34.
Wang, Ping & Liang, Chao. (2013). Research on the Demulsifier and Decalcifying Agent for Crude Oils in Electric Desalting Process. Applied Mechanics and Materials. 475-476. 1289-1293. 10.4028/www.scientific.net/AMM.475-476.1289.
Wu, Fei-yue. (2012). Research on high acid heavy crude oil electric desalting and dewatering technology. Huaiyin Shifan Xueyuan Xuebao. 11. 375-379.
Wu, Feiyue. (2012). Study on the divided-wall electric desalting technology for Suizhong crude oil. Desalination. 307. 20-25.
Xu, Jun et al. "How comb-type poly(maleic acid alkylamide-co-alpha-olefin) assemble in waxy oils and improve flowing ability," Asia-Pacific Journal of Chemical Engineering (2009) 4, 551-556.
Xu, Weixiang. (2014). Influential factors of lower freezing point heavy crude oil electrical desalting and analysis of operating process parameters. Shanghai Huagong. 39. 7-10.
Yao, Fei. (2014). Application of ultrasonic emulsion breaking technology in electrostatic desalting process. Guangdong Huagong. 41. 78-79.
Yu, Xiao-ai. (2014). Research on crude oil electric desalting and dewatering in Tianjin. Huaxue Gongchengshi. 28. 39-42.
Yu, Yanqiu. (2006). Application of new squirrel type oil condensate electric desalting. Shiyou Huagong Fushi Yu Fanghu. 23. 30-32.
Zhang, Fenghua. (2011). Study on electric desalting process for highly conductive high TAN crude oil. Lianyou Jishu Yu Gongcheng. 41. 5-8.
Zhang, Fenghua. (2013). Research progress on electro-desalting technology of crude oil. Huagong Keji. 21. 71-74.
Zhang, Yongsheng. (2011). Study on electrodesalting for highly acidic crude oil. Shihua Jishu Yu Yingyong. 29. 320-323.
Zhao, Mao. (2014). Analyze and advise of overproof in Tahe crude oil electric desalting. Shiyou Huagong Yingyong. 33. 89-91.
Zhao, Mao. (2014). Screening of additives for electro-desalting of Tahe crude oil and optimization of process conditions. Lianyou Jishu Yu Gongcheng. 44. 57-60.
Zhao, Quan-ming. (2013). Optimal operation of electric desalting system. Liaoning Huagong. 42. 248-249.
Zheng, Junhe. (2010). Study on desalting technology for Saudi mixed crude oil. Lianyou Jishu Yu Gongcheng. 40. 1-4.
Zheng, Mengzhu. (2014). Study and optimization of process conditions of electric desalination for high-TAN extra-heavy crude oil. Lianyou Jishu Yu Gongcheng. 44. 1-4.
Zhou Jian, Wang Jian. (2006). Characteristics of YFJ332 Thermal Reflection Heat Insulation Corrosion-resistant Coating and Application. Corrosion & Protection in Petrochemical Industry, 23(3), 42-44.

\* cited by examiner

CRUDE OIL DEMULSIFIER COMPOSITIONS AND USES THEREOF

TECHNICAL FIELD

The present disclosure generally relates to demulsifier compositions and methods of resolving emulsions using the compositions. More specifically, the present disclosure provides demulsifiers including modified hydroxy-succinimide copolymers and methods of using the demulsifiers for resolving oil-in-water, water-in-oil, and complex emulsions of water and oil.

BACKGROUND

Crude oil produced from geological formations may contain various amounts of water. Water and crude oil are naturally non-miscible. However, if interfacial active compounds are present, these compounds may aggregate on the water and oil interface and cause water to form droplets within the bulk oil phase. During crude oil lifting through production tubings, the water and oil encounters an increased mixing energy from rapid flow through chokes and bends. This additional mixing energy can emulsify the water and oil. Such an oil external, water internal, two-phase system is commonly referred to as a crude oil emulsion, which can be quite stable. The presence of water in crude oil, however, can interfere with refining operations, induce corrosion, increase heat capacity, and result in reduced handling capacity of pipelines and refining equipment. Therefore, the crude oil that is to be shipped out of the oilfield should be practically free of water and usually has a maximum water content limit of about 0.5 to 3% by total weight.

The emulsified water can also contain various amounts of salts. These salts are detrimental to crude oil refining processes due to potential corrosion in the refinery. In crude oil refining, desalting techniques comprise the deliberate mixing of the incoming crude oil with a fresh "wash water" to extract the water soluble salts and hydrophilic solids from the crude oil. Primary dehydration of the crude oil occurs in oil field water-oil separation systems, such as "free water knock out" and "phase separators." Quite often, these systems are not adequate for efficient separation due to factors such as over production, unexpected production changes, and system underdesigns.

Demulsifiers may be employed to break or resolve the emulsions. For example, demulsifiers may be used to resolve the water-in-oil emulsion that is formed when wash water is added to a refinery's desalter crude slate for the extraction of salts from crude oil prior to refining. Oftentimes, demulsifiers are surfactants that partition on the interface of the water droplets and the bulk hydrocarbon phase. The demulsifiers may slightly lower the interfacial surface tension between the aqueous phase and the hydrocarbon phase, remove natural stabilizers (e.g., natural surfactants, organic solids, and inorganic solids) from the interface, and allow the water droplets to coalesce.

Ethoxylated alkylphenol/formaldehyde resins, particularly resins with the nonylphenol moiety in the backbone of the resin, have been used in the industry as demulsifiers. However, nonylphenols and their ethoxylated derivatives are known to be toxic, specifically as endocrine-hormone disrupters.

BRIEF SUMMARY

In some embodiments, the present disclosure provides methods of resolving emulsions. The methods comprise providing an emulsion including water and an oil, adding a composition to the water, the oil, and/or the emulsion, wherein the composition comprises an effective amount of a demulsifier, the demulsifier comprising a modified hydroxy-succinimide copolymer, and separating the water from the oil.

In certain embodiments, there is an initial step of mixing the oil with the water to obtain the emulsion. In some embodiments, the methods include injecting the composition into a process stream comprising the oil, the water, and/or the emulsion. The composition may be added continuously or intermittently.

In some embodiments, the emulsion is allowed to stand in a quiescent state for a period of time sufficient to obtain separation into separate layers of water and oil prior to the separating.

The modified hydroxy-succinimide copolymer may be an alkoxylated hydroxy-succinimide copolymer, for example. In some embodiments, the modified hydroxy-succinimide copolymer may be selected from the group consisting of an ethoxylated hydroxy-succinimide copolymer, a propoxylated hydroxy-succinimide copolymer, a butoxylated hydroxy-succinimide copolymer, an ethoxylated and propoxylated hydroxy-succinimide copolymer, and any combination thereof.

The effective amount of the demulsifier may be about 1 ppm to about 5,000 ppm, based on volume of the oil. The modified hydroxy-succinimide copolymer may comprise a weight average molecular weight from about 5,000 Da to about 300,000 Da. The modified hydroxy-succinimide copolymer may be an ethoxylated α-olefin hydroxy-succinimide copolymer and/or a propoxylated α-olefin hydroxy-succinimide copolymer. The ethoxylated hydroxy-succinimide copolymer may be an ethoxylated α-olefin maleic anhydride copolymer functionalized with an amino-hydroxy compound or the propoxylated hydroxy-succinimide copolymer may be a propoxylated α-olefin maleic anhydride copolymer functionalized with an amino-hydroxy compound.

In some embodiments, the amino-hydroxy compound is selected from the group consisting of

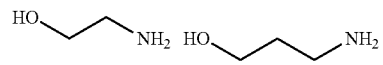

2-aminoethan-1-ol, 3-aminopropan-1-ol,

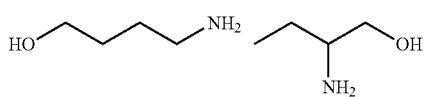

4-aminobutan-1-ol, 2-aminobutan-1-ol,

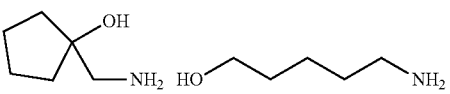

1-(aminomethyl)cyclopentan-1-ol, 5-aminopentan-1-ol,

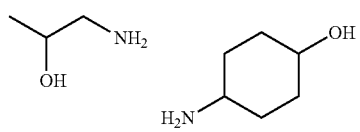

1-aminopropan-2-ol, 4-aminocyclohexan-1-ol,

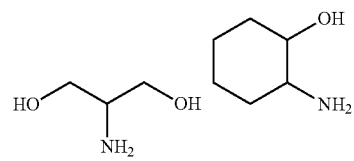

2-aminopropane-1,3-diol, 2-aminocyclohexan-1-ol,

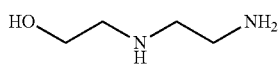

2-((2-aminoethyl)amino)ethan-1-ol,

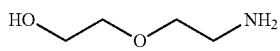

2-(2-aminoethoxy)ethan-1-ol,

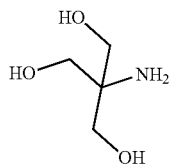

2-amino-2-(hydroxymethyl)propane-1,3-diol,

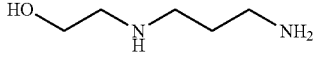

2-((3-aminopropyl)amino)ethan-1-ol,

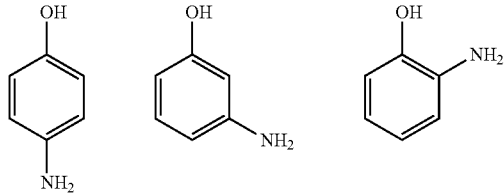 [SMILES: Nc1ccc(O)cc1 ; Nc1cccc(O)c1 ; Nc1ccccc1O]

4-aminophenol, 3-aminophenol, 2-aminophenol,

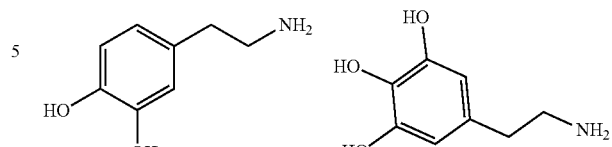

4-(2-aminoethyl)benzene-1,2-diol, 5-(2-aminoethyl)benzene-1,2,3-triol,

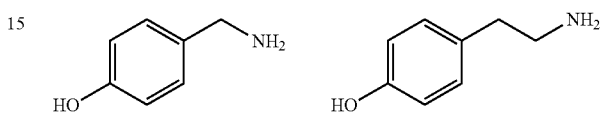

4-(aminomethyl)phenol, 4-(2-aminoethyl)phenol,

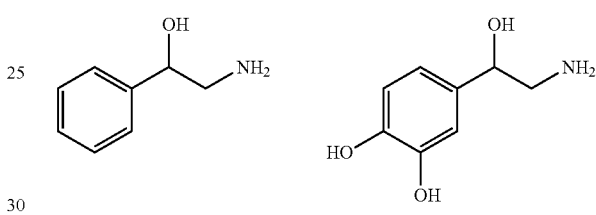

2-amino-1-phenylethan-1-ol, 4-(2-amino-1-hydroxyethyl)benzene-1,2-diol,

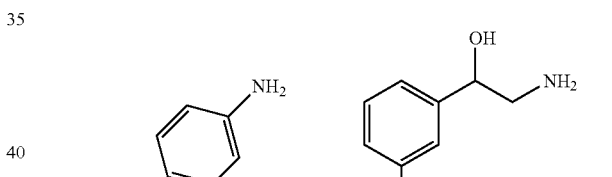

(4-aminophenyl)methanol, 3-(2-amino-1-hydroxyethyl)phenol,

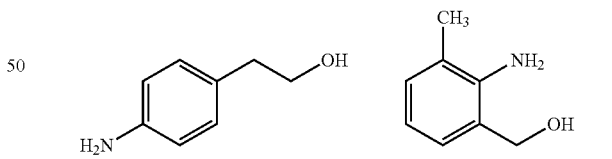

2-(4-aminophenyl)ethan-1-ol, (2-amino-3-methylphenyl)methanol,

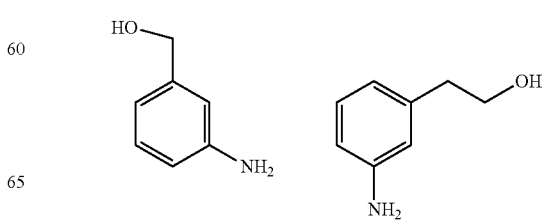

(3-aminophenyl)methanol, 2-(3-aminophenyl)ethan-1-ol,

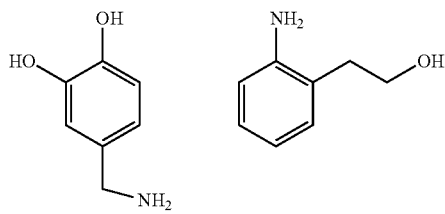 [SMILES: NCc1ccc(O)c(O)c1 ; Nc1ccccc1CCO]

4-(aminomethyl)benzene-1,2-diol, 2-(2-aminophenyl)ethan-1-ol,

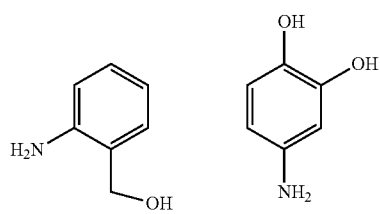 [SMILES: Nc1ccccc1CO ; Nc1ccc(O)c(O)c1]

(2-aminophenyl)methanol, 4-aminobenzene-1,2-diol, and any combination thereof.

In certain embodiments, the modified hydroxy-succinimide copolymer comprises a structure selected from formula 1 or formula 2:

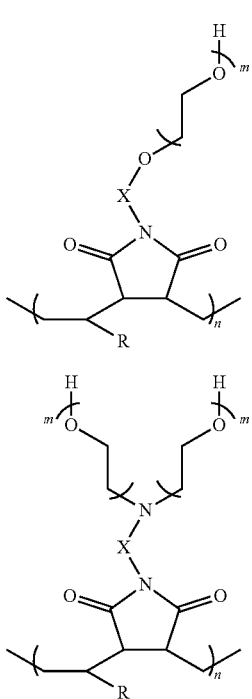

wherein R is a $C_8$ to $C_{36}$ alkyl group, X is a linking group, each m is independently selected from 1 to 50, and n is selected from 5 to 200.

In some embodiments, X is arylene or alkylene, such as —CH₂—, —CH₂CH₂—, —CH₂CH₂CH₂—, CH₂CH(CH₃)—, or —CH₂(CH₃)CH₂—, or a CH₂CH₂NHCH₂CH₂— group or a —CH₂CH₂OCH₂CH₂— group.

In certain embodiments, a solvent comprises the demulsifier. The solvent may be selected from the group consisting of toluene, heavy aromatic naphtha, xylenes, a glycol, water, an alcohol, ethylene glycol, ethylene glycol monobutyl ether, kerosene, propylene carbonate, a glycol ether, and any combination thereof.

In some embodiments, the composition is added to the wash water, the oil, and/or the emulsion during a refinery desalting operation. In some embodiments, the composition excludes an alkylphenol compound or an alkylphenol compound is not added to the oil, the wash water, or the emulsion.

The present disclosure also provides emulsions comprising water, an oil, and a composition, wherein the composition comprises an effective amount of a demulsifier, the demulsifier comprising a modified hydroxy-succinimide copolymer. The effective amount of the demulsifier may be about 1 ppm to about 5,000 ppm, based on volume of the oil. In some embodiments, the oil comprises crude oil. In certain embodiments, the modified hydroxy-succinimide copolymer comprises a weight average molecular weight from about 5,000 Da to about 300,000 Da.

In some embodiments, the modified hydroxy-succinimide copolymer is an ethoxylated α-olefin hydroxy-succinimide copolymer, a propoxylated α-olefin hydroxy-succinimide copolymer, or any combination thereof. In certain embodiments, the modified hydroxy-succinimide copolymer is an ethoxylated α-olefin maleic anhydride copolymer functionalized with an amino-hydroxy compound, a propoxylated α-olefin maleic anhydride copolymer functionalized with an amino-hydroxy compound, or any combination thereof.

The amino-hydroxy compound may be selected from the group consisting of

2-aminoethan-1-ol, 3-aminopropan-1-ol,

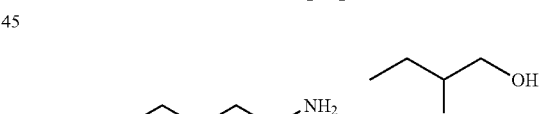

4-aminobutan-1-ol, 2-aminobutan-1-ol,

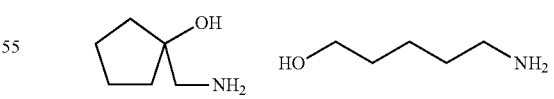

1-(aminomethyl)cyclopentan-1-ol, 5-aminopentan-1-ol,

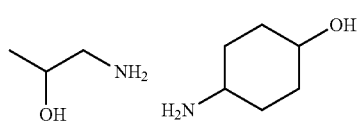

1-aminopropan-2-ol, 4-aminocyclohexan-1-ol,

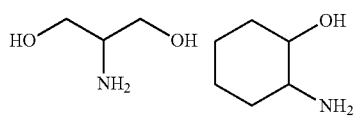

2-aminopropane-1,3-diol, 2-aminocyclohexan-1-ol,

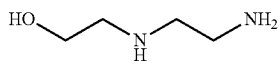

2-((2-aminoethyl)amino)ethan-1-ol,

2-(2-aminoethoxy)ethan-1-ol,

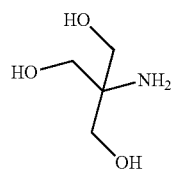

2-amino-2-(hydroxymethyl)propane-1,3-diol,

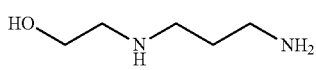

2((3-aminopropyl)amino)ethan-1-ol,

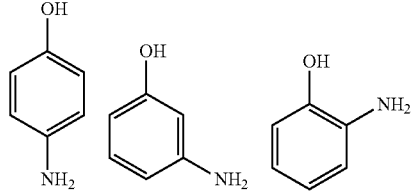

4-aminophenol, 3-aminophenol, 2-aminophenol,

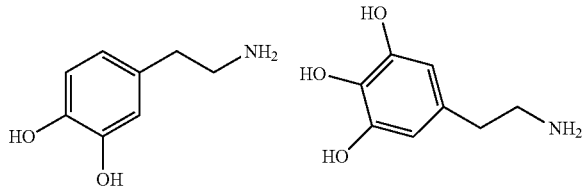 [SMILES: NCCc1ccc(O)c(O)c1 ; NCCc1cc(O)c(O)c(O)c1]

4-(2-aminoethyl)benzene-1,2-diol, 5-(2-aminoethyl)benzene-1,2,3-triol,

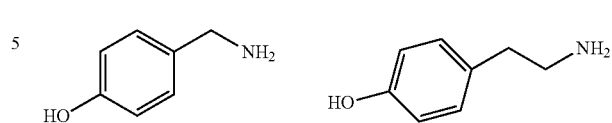

4-(aminomethyl)phenol, 4-(2-aminoethyl)phenol,

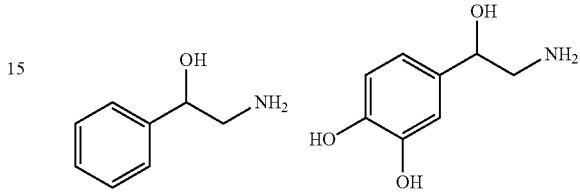

2-amino-1-phenylethan-1-ol, 4-(2-amino-1-hydroxyethyl)benzene-1,2-diol,

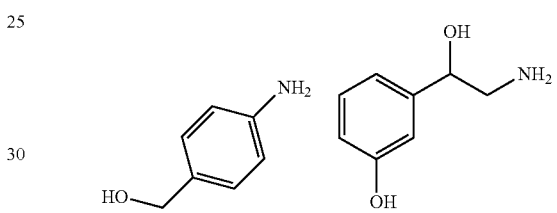

(4-aminophenyl)methanol, 3-(2-amino-1-hydroxyethyl)phenol,

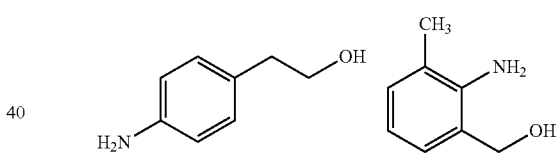

2-(4-aminophenyl)ethan-1-ol, (2-amino-3-methylphenyl)methanol,

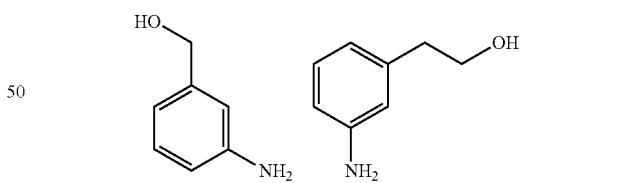

(3-aminophenyl)methanol, 2-(3-aminophenyl)ethan-1-ol,

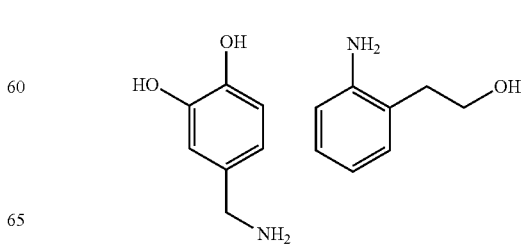

4-(aminomethyl)benzene-1,2-diol, 2-(2-aminophenyl)ethan-1-ol,

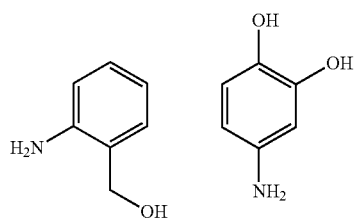 [SMILES: Nc1ccccc1CO ; Nc1ccc(O)c(O)c1]

(2-aminophenyl)methanol, 4-aminobenzene-1,2-diol, and any combination thereof.

In some embodiments, the modified hydroxy-succinimide copolymer comprises a structure selected from formula 1 or 2:

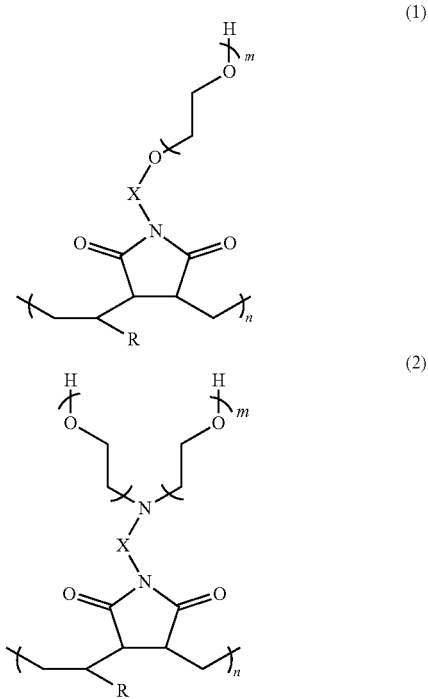

wherein R is a $C_8$ to $C_{36}$ alkyl group, X is a linking group, each m is independently selected from 1 to 50, and n is selected from 5 to 200.

In some embodiments, X is arylene or alkylene, such as —$CH_2$—, —$CH_2CH_2$—, —$CH_2CH_2CH_2$—, $CH_2CH_2(CH_3)$—, or —$CH_2(CH_3)CH_2$—, or a —$CH_2CH_2NHCH_2CH_2$— group or a —$CH_2CH_2OCH_2CH_2$— group.

In certain embodiments, the emulsion further comprises a solvent. The solvent may be selected from the group consisting of toluene, heavy aromatic naphtha, xylenes, a glycol, water, an alcohol, ethylene glycol, ethylene glycol monobutyl ether, kerosene, propylene carbonate, a glycol ether, and any combination thereof.

In some embodiments, the emulsion excludes an alkylphenol compound. In certain embodiments, the emulsion is a water-in-oil emulsion.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION

The present disclosure provides demulsifier compositions, methods of manufacturing the compositions, and methods of using the compositions for resolving emulsions of oil and water. The compositions may be used for resolving or otherwise "breaking" emulsions that typically form during crude petroleum extraction and/or refinement. As used herein, "emulsions" include water-in-oil emulsions, oil-in-water emulsions, and complex emulsions. The emulsions may comprise, for example, crude oil, refined oil, bitumen, condensate, slop oil, distillates, fuels, and mixtures thereof. The demulsifiers are also useful for resolving emulsions in butadiene, styrene, acrylic acid, and other hydrocarbon monomer process streams.

The compositions comprise effective amounts of a demulsifier and the demulsifier comprises a modified hydroxy-succinimide copolymer. In some embodiments, the modified hydroxy-succinimide copolymer is an ethoxylated hydroxy-succinimide copolymer or a propoxylated hydroxy-succinimide copolymer. In certain embodiments, the demulsifier comprises a mixture of ethoxylated and propoxylated hydroxy-succinimide copolymers. In some embodiments, the modified hydroxy-succinimide copolymer is an ethoxylated α-olefin hydroxy-succinimide copolymer and/or a propoxylated α-olefin hydroxy-succinimide copolymer. The α-olefin may be branched or linear. In certain embodiments, the ethoxylated hydroxy-succinimide copolymer is an ethoxylated α-olefin maleic anhydride copolymer functionalized with an amino-hydroxy compound. In some embodiments, the propoxylated hydroxy-succinimide copolymer is a propoxylated α-olefin maleic anhydride copolymer functionalized with an amino-hydroxy compound.

The amino-hydroxy compound is not particularly limited and may be selected from any compound including both an amino group and a hydroxyl group. In some embodiments, the amino-hydroxy compound is an aliphatic or cyclic aliphatic compound. For example, the amino-hydroxy compound may be selected from

2-aminoethan-1-ol, 3-aminopropan-1-ol,

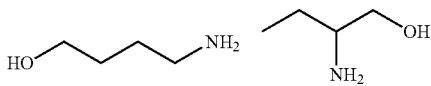

4-aminobutan-1-ol, 2-aminobutan-1-ol,

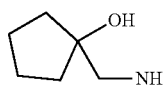 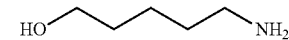

1-(aminomethyl)cyclopentan-1-ol, 5-aminopentan-1-ol,

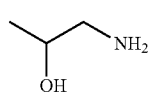 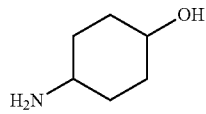

1-aminopropan-2-ol, 4-aminocyclohexan-1-ol,

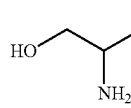 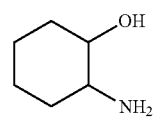

2-aminopropane-1,3-diol, 2-aminocyclohexan-1-ol,

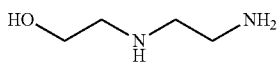

2-((2-aminoethyl)amino)ethan-1-ol,

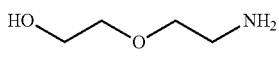

2-(2-aminoethoxy)ethan-1-ol,

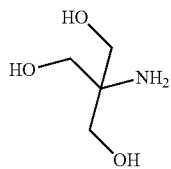

2-amino-2-(hydroxymethyl)propane-1,3-diol,

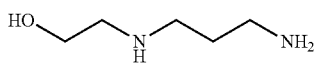

2-((3-aminopropyl)amino)ethan-1-ol,

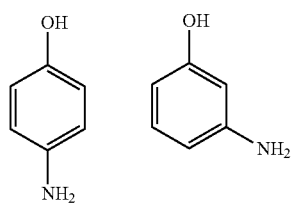

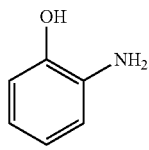

4-aminophenol, 3-aminophenol, 2-aminophenol,

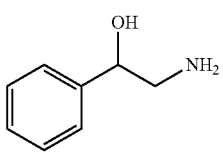

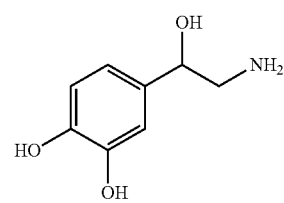

4-(2-aminoethyl)benzene-1,2-diol, 5-(2-aminoethyl)benzene-1,2,3-triol, 4-(aminomethyl)phenol, 4-(2-aminoethyl)phenol, 2-amino-1-phenylethan-1-ol, 4-(2-amino-1-hydroxyethyl)benzene-1,2-diol,

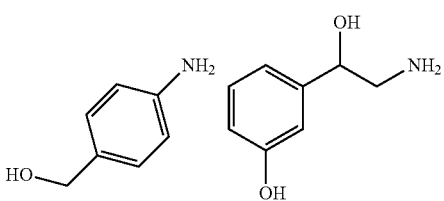

(4-aminophenyl)methanol, 3-(2-amino-1-hydroxyethyl)phenol,

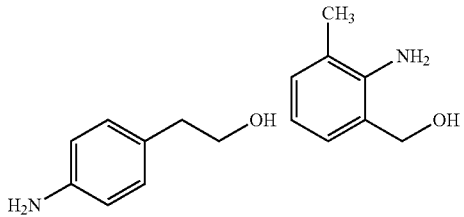

2-(4-aminophenyl)ethan-1-ol, (2-amino-3-methylphenyl)methanol,

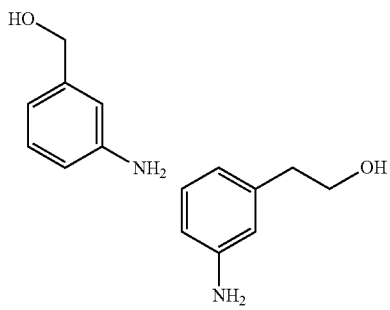

(3-aminophenyl)methanol, 2-(3-aminophenyl)ethan-1-ol,

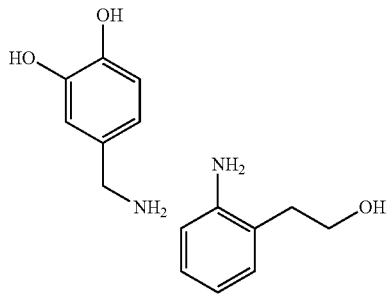

4-(aminomethyl)benzene-1,2-diol, 2-(2-aminophenyl)ethan-1-ol,

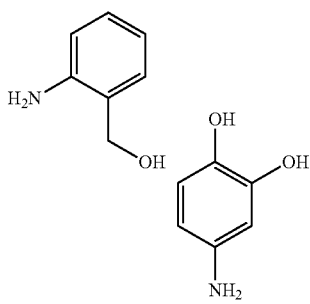

(2-aminophenyl)methanol, 4-aminobenzene-1,2-diol, and any combination thereof.

In some embodiments, the modified hydroxy-succinimide copolymer comprises a structure selected from formula 1 or formula 2:

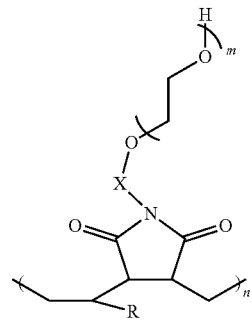

(1)

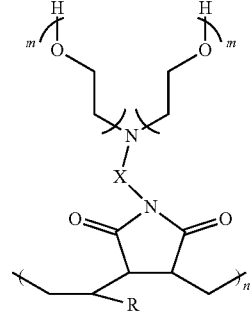

(2)

wherein R is a $C_8$ to $C_{36}$ alkyl group, X is a linking group, each m is independently selected from 1 to 50, and n is selected from 5 to 200. In some embodiments, each m is independently selected from 1 to 40, 1 to 30, 1 to 20, 1 to 10, or 1 to 5. In some embodiments, n is selected from 5 to 150, 5 to 100, 5 to 75, 5 to 50, 10 to 50, 10 to 75, 10 to 100, 10 to 150, or 10 to 200. In some embodiments, R is a $C_{10}$ to $C_{36}$ alkyl group, a $C_{12}$ to $C_{36}$ alkyl group, a $C_{14}$ to $C_{36}$ alkyl group, a $C_{16}$ to $C_{36}$ alkyl group, a $C_{18}$ to $C_{36}$ alkyl group, a $C_{20}$ to $C_{36}$ alkyl group, a $C_{22}$ to $C_{36}$ alkyl group, a $C_{24}$ to $C_{36}$ alkyl group, a $C_{26}$ to $C_{36}$ alkyl group, a $C_{28}$ to $C_{36}$ alkyl group, a $C_{30}$ to $C_{36}$ alkyl group, a $C_{32}$ to $C_{36}$ alkyl group, or a $C_{34}$ to $C_{36}$ alkyl group. The alkyl group may be substituted, unsubstituted, linear and/or branched.

Illustrative, non-limiting examples of linking groups include alkylene groups and arylene groups. Illustrative, non-limiting examples of linking groups include —CH$_2$—, —CH$_2$CH$_2$—, —CH$_2$CH$_2$CH$_2$—, —CH$_2$CH$_2$(CH$_3$)—, —CH$_2$(CH$_3$)CH$_2$—, —CH$_2$CH$_2$NHCH$_2$CH$_2$— and —CH$_2$CH$_2$OCH$_2$CH$_2$—.

Unless otherwise indicated, an alkyl group as described herein alone or as part of another group is an optionally substituted linear or branched saturated monovalent hydrocarbon substituent containing from, for example, one to about thirty-six carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The terms "aryl" or "ar" as used herein alone or as part of another group (e.g., arylene) denote optionally substituted homocyclic aromatic groups, such as monocyclic or bicyclic groups containing from about 6 to about 12 carbons in the ring portion, such as phenyl, biphenyl, naphthyl, substituted phenyl, substituted biphenyl or substituted naphthyl. The term "aryl" also includes heteroaryl functional groups.

The term "substituted" as in "substituted alkyl," means that in the group in question (i.e., the alkyl group), at least one hydrogen atom bound to a carbon atom is replaced with one or more substituent groups, such as hydroxy (—OH), alkylthio, phosphino, amido (—CON($R_A$)($R_B$), wherein $R_A$ and $R_B$ are independently hydrogen, alkyl, or aryl), amino (—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like.

When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

The weight average molecular weight of the modified hydroxy-succinimide copolymer is not particularly limited. In some embodiments, the modified hydroxy-succinimide copolymer comprises a weight average molecular weight from about 5,000 Da to about 300,000 Da. For example, the modified hydroxyl-succinimide copolymer may comprise a weight average molecular weight from about 5,000 Da to about 250,000 Da, from about 5,000 Da to about 200,000 Da, from about 5,000 Da to about 150,000 Da, from about 5,000 Da to about 100,000 Da, from about 5,000 Da to about 75,000 Da, from about 5,000 Da to about 50,000 Da, or from about 5,000 Da to about 25,000 Da.

In accordance with certain embodiments of the present disclosure, the demulsifier composition may comprise a solvent. The solvent may be selected from, for example, toluene, heavy aromatic naphtha, xylenes, a glycol, water, an alcohol, kerosene, propylene carbonate, paraffinic solvents, and any combination thereof.

In some embodiments, the alcohol may be selected from methanol, ethanol, isopropanol, 2-ethyl hexanol, benzyl alcohol, and any combination thereof. In some embodiments, the glycol may be ethylene glycol or a glycol ether, such as ethylene glycol monobutyl ether.

In addition to a modified hydroxy-succinimide copolymer, the compositions disclosed herein may include or exclude other additives. For example, the compositions may include or exclude corrosion inhibitors, viscosity reducers, friction reducers, scale inhibitors, clay swelling inhibitors, biocides, flow back aids, surfactants, and/or other chemical treatment additives used in crude oil production, refining and chemical processing. The compositions may also comprise or exclude additional demulsifiers, such as alcohols, fatty acids, fatty amines, glycols, and alkylphenol formaldehyde condensation products.

In some embodiments, the compositions disclosed herein exclude an alkylphenol compound.

Emulsions comprising the presently disclosed compositions are also provided herein. In some embodiments, an emulsion comprises water, such as wash water from a refinery desalting process, an oil, such as crude oil, and a composition, wherein the composition comprises a demulsifier and the demulsifier comprises one or more of the modified hydroxy-succinimide copolymers disclosed herein.

As noted herein, the composition may comprise or exclude a solvent and/or any additive described herein, such as a scale inhibitor or an additional demulsifier. In some embodiments, the emulsion excludes an alkylphenol compound.

The present disclosure also provides methods of manufacturing the demulsifier compositions. In some embodiments, the demulsifier synthesis includes free-radical polymerization of maleic anhydride with an α-olefin to produce an α-olefin maleic anhydride copolymer, condensation of the copolymer with an amino alcohol to form a hydroxyl-succinimide copolymer, and modification (ethoxylation, propoxylation, etc.) of the hydroxyl-succinimide copolymer to produce the final demulsifier.

In an illustrative, non-limiting example, an α-olefin/maleic anhydride copolymer (5) (OMAC) is synthesized by reacting the α-olefin (3) with maleic anhydride (4) using conventional techniques, e.g., radical addition polymerization principles and techniques familiar to those skilled in the art of polymer synthesis (Scheme 1). The synthesis of such precursor polymers is also described in Comer et al., U.S. Pat. No. 5,214,224, which is expressly incorporated by reference into the present application.

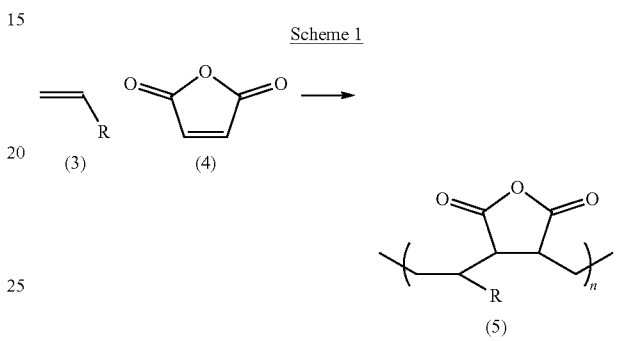

The copolymer may comprise a mole ratio of α-olefin to maleic anhydride ranging from, for example, 1:4 to 4:1. The weight average molecular weight of the copolymer may be from about 5,000 Da to about 300,000 Da, for example, when analyzed by gel permeation chromatography (GPC).

The copolymer may then be reacted with an amino-hydroxy compound (6) to form the corresponding hydroxy-succinimide (7). The reaction may be carried out at temperatures between about 100° C. and about 180° C. to provide a hydroxy-containing succinimide in the backbone via water molecule elimination (Scheme 2). For example, the reaction may be carried out at temperatures between about 120° C. and about 180° C., between about 140° C. and about 180° C., or between about 160° C. and about 180° C.

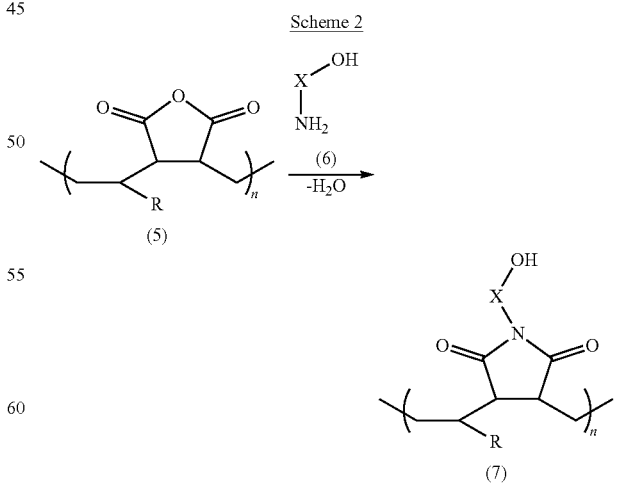

The amino-hydroxy compound (6) could be any compound that comprises an amino group and a hydroxy group. For example, the amino-hydroxy compound can be any acylic or cyclic aliphatic amino-hydroxy compound herein or any aromatic amino-hydroxy compound disclosed herein. The reaction may be carried out using a molar ratio of amine moieties to anhydride moieties of, for example, about 1:1. The reaction is carried out in a solvent, such as a petroleum solvent (e.g., paraffinic solvents, mineral oil, "HAN" or heavy aromatic naphtha/Aromatic 150, any mixture thereof, and the like.

Amino-hydroxy compounds are bifunctional compounds and may react with the anhydride through both the amino- and the hydroxy-functionalities. The amine group is more nucleophilic than the hydroxyl group, will have higher reactivity, and will react with the anhydride under milder conditions as compared to hydroxy group. Three possible ring-opened products may be obtained from the reaction of the amino-hydroxy compound and the anhydride. An illustrative, non-limiting example is below. However, the amino-hydroxy compound is not limited to the one below and any amino-hydroxy compound may be used.

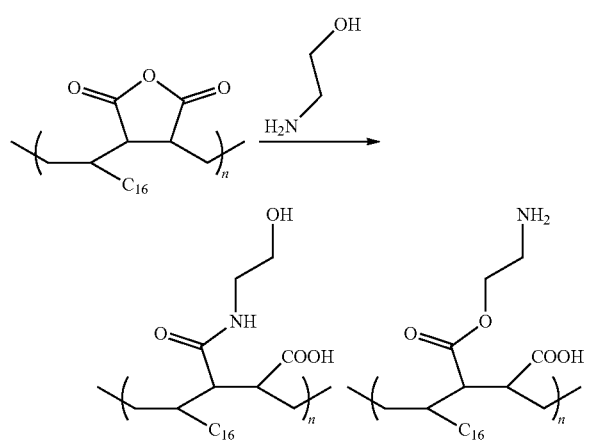

As can be seen, the reaction may produce a half amide-half acid structure

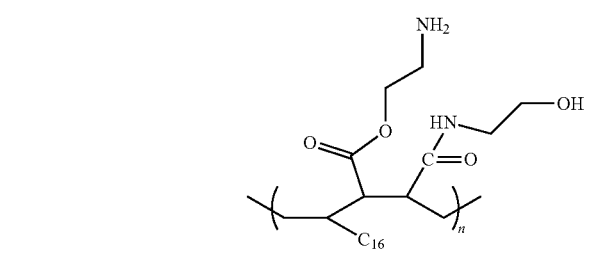

a half amide-half ester structure

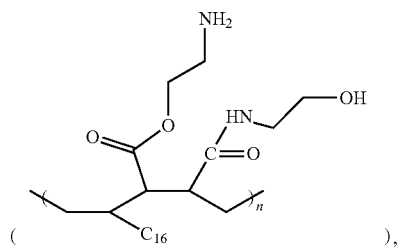

and/or a half acid-half ester structure

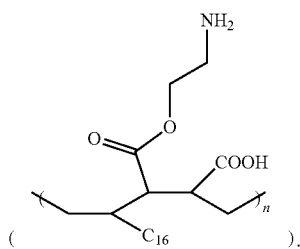

In certain embodiments, the composition of the present disclosure includes or excludes the half amide-half acid structure. In certain embodiments, the composition includes or excludes the half amide-half ester structure. In certain embodiments, the composition includes or excludes the half acid-half ester structure.

The hydroxy succinimide copolymer (7) may then be modified. For example, the copolymer may be oxyalkylated with ethylene oxide to produce a compound of formula (1) (Scheme 3). Typically, the copolymer is reacted with about 1 to about 30 molar equivalents of ethylene oxide, propylene oxide, or mixtures of ethylene oxide and propylene oxide. The reaction may be catalyzed with a metal alkoxide, such as potassium hydroxide or sodium methoxide, and may be carried out in a solvent, such as a petroleum solvent (e.g., paraffinic solvents, mineral oil, "HAN" or heavy aromatic naphtha/Aromatic 150, mixtures thereof, and the like).

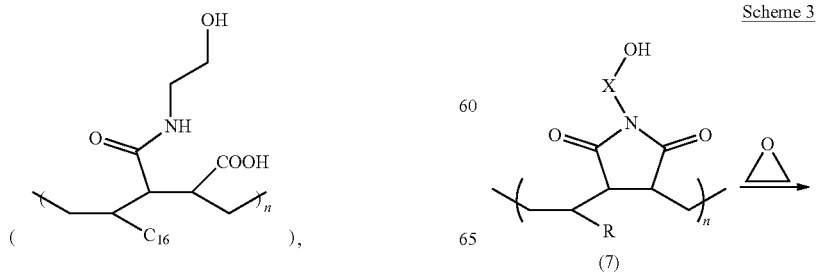

Scheme 3

-continued

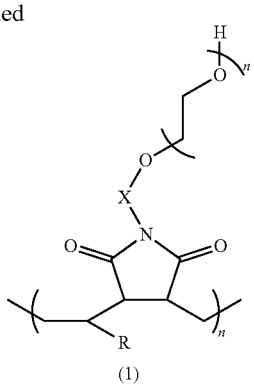

(1)

The catalyzed copolymer may be added to an oxyalkylation apparatus (Paar Reactor). A nitrogen atmosphere may be established in the system and the acceptor solution may be heated to about 150° C. A calculated quantity of ethylene oxide may be added and the reaction temperature may be maintained at about 150 to about 160° C. The system pressure may be maintained below about 60 psi. The ethylene oxide is allowed to react until the system pressure stabilizes. A weighed sample may then be collected. Ethylene oxide addition, reaction, and sample collection may be continued as needed to generate a series of ethoxylated copolymers reacted with varying amounts of ethylene oxide.

The present disclosure additionally provides methods of resolving emulsions using the presently disclosed demulsifier compositions. In some embodiments, the method may include the step of adding a composition disclosed herein to the emulsion. In certain embodiments, the method may comprise an initial step of mixing water and an oil to form the emulsion. The composition may be added to the emulsion, to the water, and/or to the oil. In some embodiments, the composition may be injected into a process stream comprising the oil, the water, and/or the emulsion. The composition may be added continuously or in batch fashion. The composition may be any composition disclosed herein, such as a composition comprising the modified hydroxysuccinimide copolymer. After a period of time, the water may be separated from the oil.

The compositions of the present disclosure may be used in methods for demulsifying water-in-oil emulsions, oil-in-water emulsions, and complex emulsions in various production and refinery processes. Specific examples include, but are not limited to, oilfield production emulsions, refinery desalting emulsions, refined fuel emulsions, and recovered oil emulsions (e.g., crude oil slop, used lubricant oils, and recovered oils in the steel and aluminum industries).

In a refinery desalting process, the incoming crude is deliberately mixed with wash water to remove dissolved salts and other contaminants. To extract water from the resulting water-in-crude oil emulsion, the emulsion may be admixed with an effective amount of a demulsifier.

A typical desalting process includes the use of pumps to move the incoming crude oil from storage tanks via piping through one or more heat exchangers. Wash water may be injected into the heated oil stream and the stream may be mixed by an in-line mixing device. The emulsified stream may flow into an electrostatic desalter vessel where resolution and separation of the crude oil and water effluent occur. Injection of a composition into the fluid stream can be carried out at various places along the path of the desalting process. Potential injection locations include, but are not limited to, prior to the crude oil storage tanks, on the outlet side of the crude oil storage tanks, upstream of the in-line mixer, into the wash water stream, and other potential locations.

For use in refinery desalting emulsions, the compositions disclosed herein can be applied to the emulsions, the oil phase, the water phase, or any combination thereof. In some embodiments, the compositions may be applied to the suction of the crude charge pump in the refinery crude unit. Additionally or alternatively, the compositions may also be applied to the desalter wash water.

In some embodiments, the demulsifier composition may be combined with a reverse emulsion breaker and added together to the emulsion, the oil, and/or the wash water. In certain embodiments, the reverse emulsion breaker may be added separately from the composition to the emulsion, the wash water, and/or the oil.

In some embodiments, the demulsifier composition is introduced into a crude oil emulsion by injecting the composition beneath the surface into the oil well, by injecting into the crude oil at the well-head, or by injecting into the crude oil process stream at a point between the well-head and the final oil storage tank. The demulsifier composition may be injected continuously or in batch fashion. The injecting is generally accomplished using electric or gas pumps.

In accordance with the methods disclosed herein, the treated emulsion may be allowed to stand in a quiescent state until the desired separation into distinct layers of water and oil results. Once separation into distinct layers of water and oil has been effected, various means known in the art can be utilized for withdrawing the free water and separating the crude oil.

The amount of demulsifier added depends on certain factors, such as the particular crude oil emulsion being treated. In general, the effective amount of the demulsifier ranges from about 1 ppm to about 5,000 ppm, based on volume of the oil. For example, the effect amount may be from about 1 ppm to about 3,000 ppm, from about 1 ppm to about 1,000 ppm, from about 1 ppm to about 500 ppm, from about 1 ppm to about 250 ppm, from about 1 ppm to about 200 ppm, from about 1 ppm to about 150 ppm, from about 1 ppm to about 100 ppm, from about 1 ppm to about 50 ppm, or from about 1 ppm to about 25 ppm, based on volume of the oil.

The foregoing may be better understood by reference to the following examples, which are intended for illustrative purposes and are not intended to limit the scope of the disclosure or its application in any way.

EXAMPLES

The following is a representative synthetic scheme for Polymer 1.

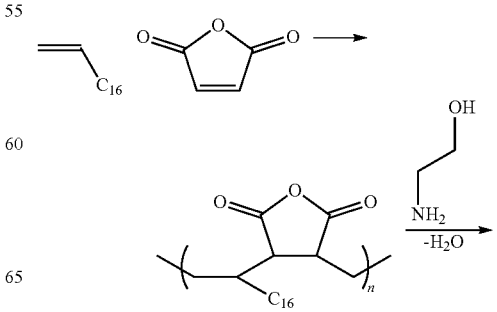

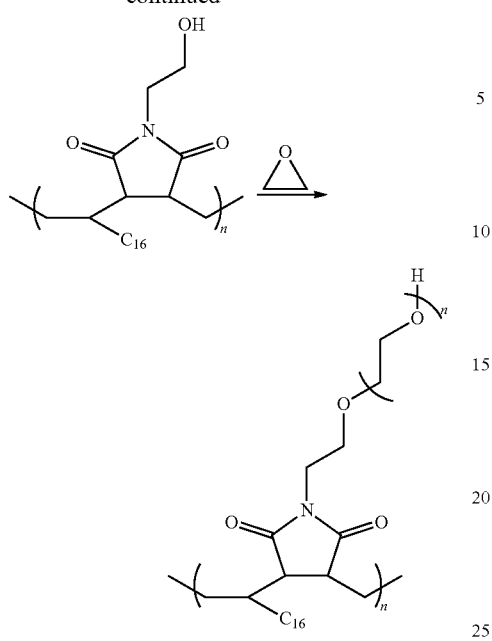

1-octadecene (151.5 g, 600 mmol), maleic anhydride (58.8 g, 600 mmol), and Aromatic 150 (109.4 g) were added to a 1000-m L, 4-neck round bottom flask equipped with a mechanical stirrer and Dean Stark trap. The reaction was purged continuously with nitrogen. The reaction temperature was increased to 130° C. with stirring. At 130° C., the initiator, tert-butyl peroxybenzoate (1.17 g, 6 mmol), was added and the reaction was held at 130-140° C. for approximately 2 hours. FTIR analysis of the reaction indicated the maleic anhydride was fully consumed. The maleic anhydride α-olefin copolymer intermediate had a Mw of 8,600 g/mol as determine by GPC. The reaction was diluted with 128.6 g of Aromatic 150 solvent, and reheated to 135° C. Ethanolamine (36.6 g, 600 mmol) was added to the reaction dropwise and the reaction temperature was increased to 170° C. to remove water. Approximately 8.5 mL of water was collected in the Dean-Stark trap during the condensation step. The hydroxy succinimide copolymer Mw was 9,600 g/mol by GPC. Following the condensation step, the reaction was cooled to 60° C., and a 25 wt. % solution sodium methoxide in methanol (6.5 g, 30 mmol) was added to catalyze the hydroxy succinimide for ethoxylation. The reaction was heated to 120° C. to remove methanol and approximately 5-mL of methanol was collected in the Dean-Stark trap. The catalyzed polymer was then oxyalkylated with varying amounts of ethylene oxide according to the general oxyalkylation procedure outlined above.

The following is a representative synthetic scheme for Polymer 2.

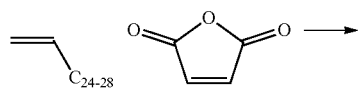

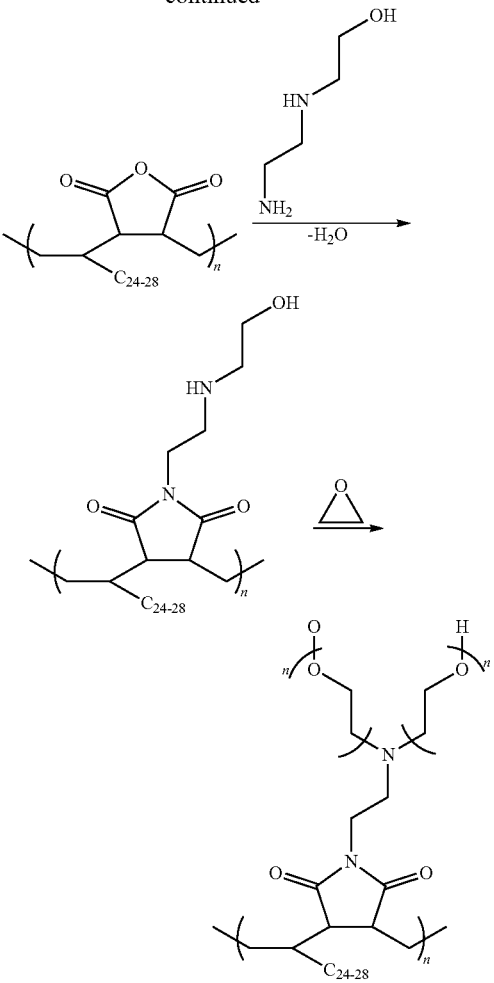

$C_{24}$-$C_{28}$ α-olefin (Chevron Philips Chemical, AlphaPlus®, 171.0 g) and maleic anhydride (500 mmol, 49.0 g) were added to a 1000-mL, 4-neck round bottom flask equipped with a mechanical stirrer and Dean Stark trap. The reaction was purged continuously with nitrogen. The reaction temperature was increased to 145° C. with stirring. To control the exotherm during polymerization, the initiator, tert-butyl peroxybenzoate, was added in five, (0.24 g, 1.25 mmol), portions at 30-minute intervals for a total polymerization time of approximately 2.5-3 hours. During the polymerization, the reaction was closely monitored to keep the temperature between 145° C. and 155° C. After the polymerization, the reaction was slowly diluted with 390.5 g of Aromatic 150 solvent and the temperature was brought to 120° C. The AOMA copolymer intermediate was analyzed by GPC and had a Mw of 44,000 g/mol. Once a temperature of 120° C. was achieved, the reaction heating block was set to heat to 180° C. During the heating ramp to 180° C., when the internal reaction temperature was 125° C., aminoethylethanolamine (49.5 g, 475 mmol) was added to the reaction rapidly. The addition of the aminoethylethanolamine was exothermic and led to an initial, rapid increase in viscosity, which diminished as the condensation reaction proceeded. The reaction was held at 180° C. for 1 hour and water was collected in the Dean Stark trap. After the condensation step, the reaction was cooled to ambient temperature overnight. To catalyze the hydroxy succinimide copolymer for ethoxylation, the reaction temperature was increased to 80° C., and a 45 wt. % aqueous potassium hydroxide (3.1 g, 25 mmol) was added. The reaction was heated to 140° C. to remove water. The catalyzed polymer was then oxyalkylated with varying amounts of ethylene oxide according to the general oxyalkylation procedure outlined above.

The relative performance of various demulsifiers was compared using the Portable Electric Desalter (PED) test. A water-in-oil emulsion was prepared by blending a fixed volume of water and crude oil. The emulsion was poured into various glass tubes and each tube was capped with an electrode assembly. The tubes were then placed into a heating block of the PED unit. The emulsions were resolved with the assistance of constant heating and the intermittent application of an electric field. The resolution of the emulsion was observed at fixed intervals during the testing. The total volume of resolved water and the rate of water drop were used to compare the performance of the demulsifiers. This method differentiates chemistries based on their ability to promote water coalescence.

Oil, water, and demulsifier were added to prescription bottles and placed in a 90° C. water bath. The demulsifiers were diluted to 5 wt. % activity in Aromatic 150 or toluene to allow for accurate dosing.

The water oil mixture was poured from the prescription bottle into a Waring® blender. The emulsification time and blending power were adjusted to achieve a relatively stable untreated emulsion. The emulsions were generated sequentially.

Next, the emulsions were poured into the PED tubes and placed into the PED heating block. Voltage was applied to the cells intermittently to aid emulsion resolution and, at set times, the water coalescence was observed visually and recorded. The specific PED test conditions for PED Tests 1-2 are provided in Table 1 and Table 2.

TABLE 1

PED Test 1 and 2 Conditions

| Crude Oil API | 21.3° |
|---|---|
| % Wash Water | 5 |
| PED Temperature | 120° C. |
| Active Demulsifier Dose Rate | 20-ppm |
| Emulsification Time | 5 s |
| Emulsification Power | 50% |
| Total Water | 2.5 mL |
| Total Oil | 47.5 mL |
| Total Fluid Volume | 50.0 mL |

TABLE 2

PED Time and Voltage

| Time Voltage Applied (min) | Voltage Duration (min) | Voltage (V) |
|---|---|---|
| 7 | 2 | 1,000 |
| 12 | 2 | 1,000 |
| 17 | 2 | 1,000 |
| 22 | 2 | 2,000 |
| 27 | 2 | 2,000 |
| 32 | 2 | 2,000 |
| 37 | 2 | 2,000 |
| 42 | 2 | 2,000 |

TABLE 3

Description of chemical demulsifiers

| Demulsifier | Description |
|---|---|
| NP-1 | Commercial ethoxylated nonylphenol formaldehyde demulsifier |
| NP-2 | Commercial ethoxylated nonylphenol formaldehyde demulsifier |
| 1-4 | Polymer 1 reacted with 4 moles of ethylene oxide |
| 1-6 | Polymer 1 reacted with 6 moles of ethylene oxide |
| 1-8 | Polymer 1 reacted with 8 moles of ethylene oxide |
| 1-10 | Polymer 1 reacted with 10 moles of ethylene oxide |
| 1-12 | Polymer 1 reacted with 12 moles of ethylene oxide |
| 2-4 | Polymer 2 reacted with 4 moles of ethylene oxide |
| 2-5 | Polymer 2 reacted with 5 moles ethylene oxide |
| 2-6 | Polymer 2 reacted with 6 moles of ethylene oxide |
| 2-7 | Polymer 2 reacted with 7 moles of ethylene oxide |
| 2-8 | Polymer 2 reacted with 8 moles of ethylene oxide |

These results of PED Tests 1-2 (Tables 4-5) clearly show the inventive compositions function as crude oil demulsifiers. The emulsions treated with the inventive demulsifiers resolve significantly faster and to a higher extent than the untreated emulsion. Furthermore, these demulsifiers show competitive performance to commercial, ethoxylated nonylphenol formaldehyde demulsifiers.

TABLE 4

PED Test 1, percent water coalescence versus time in minutes

| PED Tube | Demulsifier | 5 | 10 | 15 | 20 | 25 | 30 | 35 | 40 | 45 |
|---|---|---|---|---|---|---|---|---|---|---|
| 1 | Untreated | 0 | 0 | 4 | 24 | 28 | 36 | 40 | 40 | 48 |
| 2 | NP-1 | 0 | 4 | 16 | 28 | 40 | 56 | 72 | 80 | 88 |
| 3 | NP-2 | 0 | 20 | 28 | 36 | 44 | 64 | 72 | 80 | 80 |
| 4 | 1-4 | 0 | 0 | 24 | 36 | 48 | 72 | 80 | 88 | 88 |
| 5 | 1-6 | 0 | 16 | 24 | 36 | 48 | 72 | 80 | 88 | 88 |
| 6 | 1-8 | 0 | 16 | 24 | 36 | 48 | 72 | 80 | 80 | 88 |
| 7 | 1-10 | 0 | 20 | 28 | 40 | 56 | 72 | 80 | 80 | 88 |
| 8 | 1-12 | 0 | 24 | 36 | 40 | 56 | 72 | 80 | 80 | 88 |

TABLE 5

PED Test 2, % water coalescence versus time in minutes

| PED Tube | Demulsifier | 5 | 10 | 15 | 20 | 25 | 30 | 35 | 40 | 45 |
|---|---|---|---|---|---|---|---|---|---|---|
| 1 | Untreated | 0 | 0 | 20 | 28 | 32 | 36 | 36 | 36 | 40 |
| 2 | NP-1 | 0 | 4 | 24 | 40 | 64 | 72 | 80 | 88 | 88 |
| 3 | NP-2 | 0 | 8 | 32 | 40 | 64 | 72 | 80 | 80 | 88 |
| 4 | 2-4 | 0 | 8 | 32 | 40 | 64 | 72 | 80 | 88 | 88 |
| 5 | 2-5 | 0 | 16 | 32 | 40 | 56 | 72 | 80 | 80 | 88 |
| 6 | 2-6 | 0 | 20 | 32 | 40 | 56 | 72 | 80 | 88 | 88 |
| 7 | 2-7 | 0 | 24 | 36 | 48 | 64 | 80 | 80 | 88 | 88 |
| 8 | 2-8 | 0 | 24 | 40 | 56 | 72 | 80 | 88 | 96 | 96 |

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a demulsifier" is intended to include "at least one demulsifier" or "one or more demulsifiers."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Any composition disclosed herein may comprise, consist of, or consist essentially of any element, component and/or ingredient disclosed herein or any combination of two or more of the elements, components or ingredients disclosed herein.

Any method disclosed herein may comprise, consist of, or consist essentially of any method step disclosed herein or any combination of two or more of the method steps disclosed herein.

The transitional phrase "comprising," which is synonymous with "including," "containing," or "characterized by," is inclusive or open-ended and does not exclude additional, un-recited elements, components, ingredients and/or method steps.

The transitional phrase "consisting of" excludes any element, component, ingredient, and/or method step not specified in the claim.

The transitional phrase "consisting essentially of" limits the scope of a claim to the specified elements, components, ingredients and/or steps, as well as those that do not materially affect the basic and novel characteristic(s) of the claimed invention.

Unless specified otherwise, all molecular weights referred to herein are weight average molecular weights and all viscosities were measured at 25° C. with neat (not diluted) polymers.

As used herein, the term "about" refers to the cited value being within the errors arising from the standard deviation found in their respective testing measurements, and if those errors cannot be determined, then "about" may refer to, for example, within 5% of the cited value.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. An emulsion, comprising water, an oil, and a composition, wherein the composition comprises an effective amount of a demulsifier, the demulsifier comprising a modified hydroxy-succinimide copolymer, wherein the modified hydroxy-succinimide copolymer comprises a structure selected from formula 1 or formula 2:

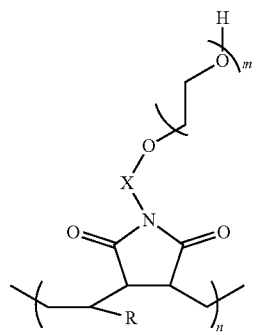

(1)

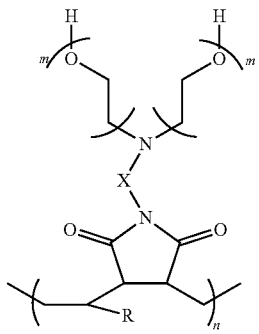

(2)

wherein R is a $C_8$ to $C_{36}$ alkyl group, X is linking group, each m is independently selected from 1 to 50, and n is selected from 5 to 200.

2. The emulsion of claim 1, wherein the modified hydroxy-succinimide copolymer is an ethoxylated α-olefin hydroxy-succinimide copolymer.

3. The emulsion of claim 1, wherein the emulsion excludes an alkylphenol compound.

4. A method of resolving an emulsion, comprising:

providing an emulsion including water and an oil, adding a composition to the water, the oil, and/or the emulsion, wherein the composition comprises an effective amount of a demulsifier, the demulsifier comprising a modified hydroxy-succinimide copolymer, and separating the water from the oil, wherein the modified hydroxy-succinimide copolymer comprises a structure selected from formula 1 or formula 2:

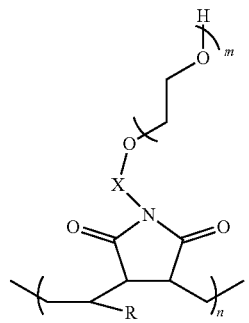

(1)

-continued (2)

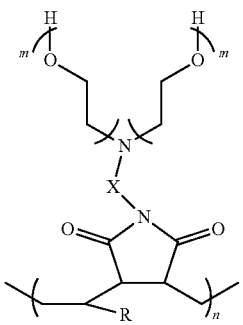

wherein R is a $C_8$ to $C_{36}$ alkyl group, X is linking group, each m is independently selected from 1 to 50, and n is selected from 5 to 200.

5. The method of claim 4, further comprising mixing the oil with the water to obtain the emulsion.

6. The method of claim 4, further comprising injecting the composition into a process stream comprising the oil, the water, and/or the emulsion.

7. The method of claim 4, further comprising allowing the emulsion to stand in a quiescent state for a period of time sufficient to obtain separation into separate layers of water and oil prior to the separating.

8. The method of claim 4, wherein the effective amount of the demulsifier is about 1 ppm to about 5,000 ppm, based on volume of the oil.

9. The method of claim 4, wherein the oil comprises crude oil.

10. The method of claim 4, wherein the modified hydroxy-succinimide copolymer comprises a weight average molecular weight from about 5,000 Da to about 300,000 Da.

11. The method of claim 4, wherein the modified hydroxy-succinimide copolymer is an ethoxylated α-olefin hydroxy-succinimide copolymer.

12. The method of claim 4, wherein the modified hydroxy-succinimide copolymer is an ethoxylated α-olefin maleic anhydride copolymer functionalized with an amino-hydroxy compound.

13. The method of claim 12, wherein the amino-hydroxy compound is

selected from the group consisting of 2-aminoethan-1-ol,

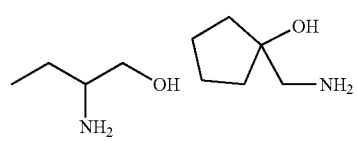

3-aminopropan-1-ol, 4-aminobutan-1-ol, 2-aminobutan-1-ol, 1-(aminomethyl)cyclopentan-1-ol,

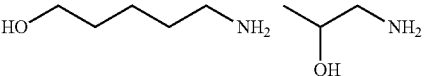

5-aminopentan-1-ol, 1-aminopropan-2-ol,

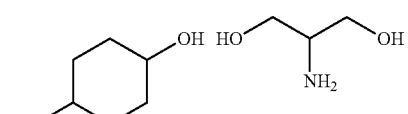

4-aminocyclohexan-1-ol, 2-aminopropane-1,3-diol,

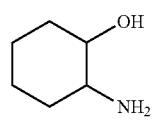

2-aminocyclohexan-1-ol,

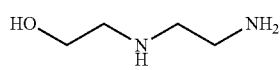

2-((2-aminoethyl)amino)ethan-1-ol,

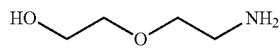

2-(2-aminoethoxy)ethan-1-ol,

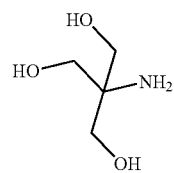

2-amino-2-(hydroxymethyl)propane-1,3-diol,

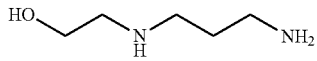

2-((3-aminopropyl)amino)ethan-1-ol,

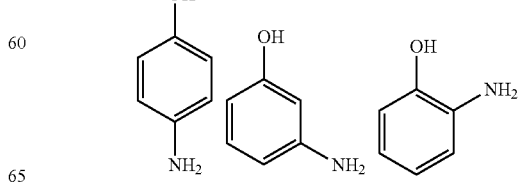

4-aminophenol, 3-aminophenol, 2-aminophenol,

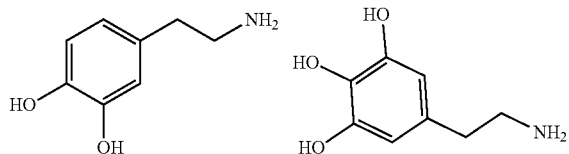 [SMILES: NCCc1ccc(O)c(O)c1 ; NCCc1cc(O)c(O)c(O)c1]

4-(2-aminoethyl)benzene-1,2-diol, 5-(2-aminoethyl)benzene-1,2,3-triol,

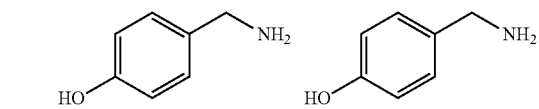 [SMILES: NCc1ccc(O)cc1 ; NCc1ccc(O)cc1]

4-(aminomethyl phenol, 4-(2-aminoethyl)phenol,

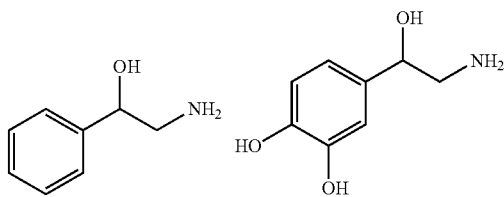 [SMILES: NCC(O)c1ccccc1 ; NCC(O)c1ccc(O)c(O)c1]

2-amino-1-phenylethan-1-ol, 4-(2-amino-1-hydroxyethyl)benzene-1,2-diol,

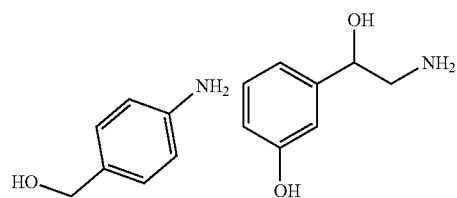

(4-aminophenyl)methanol, 3-(2-amino-1-hydroxyethyl)phenol,

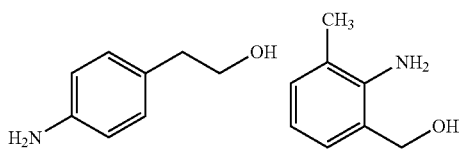

2-(4-aminophenyl)ethan-1-ol, (2-amino-3-methylphenyl)methanol,

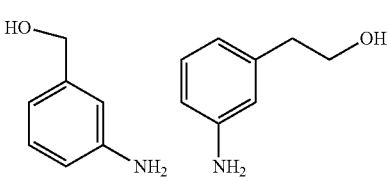 [SMILES: Nc1cccc(CO)c1 ; Nc1cccc(CCO)c1]

(3-aminophenyl)methanol, 2-(3-aminophenyl)ethan-1-ol,

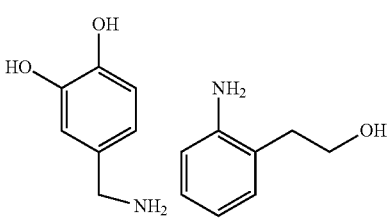

4-(aminomethyl)benzene-1,2-diol, 2-(2-aminophenyl)ethan-1-ol,

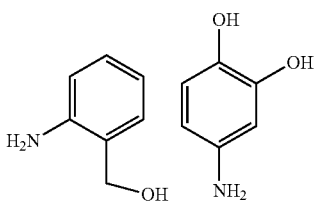

(2-aminophenyl)methanol, 4-aminobenzene-1,2-diol, and any combination thereof.

14. The method of claim 4, wherein R is a $C_{16}$ to $C_{36}$ alkyl group.

15. The method of claim 4, wherein X is an arylene group, an alkylene group, a —$CH_2CH_2NHCH_2CH_2$—group or a —$CH_2CH_2OCH_2CH_2$—group.

16. The method of claim 4, wherein the composition is added to the water, the oil, and/or the emulsion during a refinery desalting operation.

17. The method of claim 4, wherein the composition excludes an alkylphenol compound or wherein an alkylphenol compound is not added to the oil, the wash water, or the emulsion.

18. The method claim 4, wherein the emulsion is a water-in-oil emulsion.

\* \* \* \* \*